(12) United States Patent
Patzwald

(10) Patent No.: US 8,860,931 B2
(45) Date of Patent: Oct. 14, 2014

(54) CHROMATIC RANGE SENSOR INCLUDING MEASUREMENT RELIABILITY CHARACTERIZATION

(75) Inventor: Andrew Michael Patzwald, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 37 days.

(21) Appl. No.: 13/405,210

(22) Filed: Feb. 24, 2012

(65) Prior Publication Data

US 2013/0222815 A1  Aug. 29, 2013

(51) Int. Cl.
*G01C 3/08* (2006.01)

(52) U.S. Cl.
USPC .............. 356/4.01; 356/3.01; 356/9; 356/625

(58) Field of Classification Search
USPC ........... 356/609, 5.01, 4.01; 358/1.9; 386/307
See application file for complete search history.

(56) References Cited

U.S. PATENT DOCUMENTS

| | | | | |
|---|---|---|---|---|
| 4,701,049 | A * | 10/1987 | Beckman et al. | 356/3.07 |
| 6,530,156 | B1 * | 3/2003 | Matsuyama | 33/507 |
| 7,191,184 | B2 | 3/2007 | Laborde | |
| 7,477,401 | B2 | 1/2009 | Marx | |
| 7,873,488 | B2 | 1/2011 | Nahum | |
| 7,876,456 | B2 | 1/2011 | Sesko | |
| 7,876,546 | B2 | 1/2011 | Locke | |
| 7,990,522 | B2 | 8/2011 | Sesko | |
| 8,078,245 | B2 * | 12/2011 | Daly et al. | 600/319 |
| 8,134,691 | B2 | 3/2012 | Xie | |
| 2005/0030528 | A1 | 2/2005 | Geffen | |
| 2007/0237048 | A1 | 10/2007 | Matsui | |
| 2008/0030743 | A1 | 2/2008 | Lehmann | |
| 2008/0259783 | A1 | 10/2008 | Miyashta | |
| 2009/0296118 | A1 * | 12/2009 | Tsukamoto | 358/1.9 |
| 2010/0003005 | A1 * | 1/2010 | Sugihara et al. | 386/4 |
| 2010/0188742 | A1 | 7/2010 | Chen | |
| 2010/0268544 | A1 | 10/2010 | Nitahara | |
| 2010/0284025 | A1 | 11/2010 | Sesko | |
| 2010/0332173 | A1 | 12/2010 | Watson | |
| 2011/0066385 | A1 | 3/2011 | Rajwa | |
| 2011/0080576 | A1 | 4/2011 | Thiel | |
| 2011/0133054 | A1 | 6/2011 | Campbell | |
| 2011/0184694 | A1 | 7/2011 | Grimberg | |
| 2011/0267459 | A1 | 11/2011 | Choi | |
| 2011/0286006 | A1 | 11/2011 | Xie | |
| 2011/0317171 | A1 * | 12/2011 | Emtman et al. | 356/609 |

OTHER PUBLICATIONS

International Search Report and Written Opinion mailed Jun. 4, 2013, in International Application No. PCT/US2013/027687, filed Feb. 25, 2013, 7 pages.

* cited by examiner

*Primary Examiner* — Luke Ratcliffe
*Assistant Examiner* — Samantha K Abraham
(74) *Attorney, Agent, or Firm* — Christensen O'Connor Johnson Kindness PLLC

(57) ABSTRACT

A method of categorizing the reliability of measurement data in a chromatic range sensor (e.g., an optical pen) which uses chromatically dispersed light to measure the distance to a surface. In one embodiment, the system performs a number of predetermined reliability checks which determine the reliability categories for the sets of measurement data. The reliability categories may be stored as metadata with the respective workpiece height measurements that are determined from the associated measurement data. The reliability categories may be reported to the user (e.g., as graphical reliability category indicators that accompany a graphical display of the measurement data). With these reliability categories, the user may make informed decisions regarding the measurement data (e.g., deciding to filter out data that is associated with certain reliability categories, making adjustments to the setup to achieve improved measurements, etc.).

19 Claims, 11 Drawing Sheets

| Distance Indicating Coordinate (DIC) | Measurement Distance (microns) |
|---|---|
| 1 | Out of range |
| ≈ | ≈ |
| 104.1 | 36.9029 |
| 104.2 | 37.0303 |
| 104.3 | 37.1804 |
| 104.4 | 37.3557 |
| 104.5 | 37.4863 |
| ≈ | ≈ |
| 604.1 | 381.6882 |
| 604.2 | 381.7224 |
| 604.3 | 381.7565 |
| ≈ | ≈ |
| 990.1 | 486.6540 |
| 990.2 | 486.6733 |
| ≈ | ≈ |
| 1024 | Out of range |

|  | 820 | 830 | 840 |
|---|---|---|---|
| 850A → | Normal | N/A | No category criteria violations |
| 850B → | Invalid Position Table | Error | The current position table does not match the system hardware. |
| 850C → | Out of Range | Error | The distance indicating coordinate determined for the profile is outside of the valid range of the position lookup table. |
| 850D → | Not Enough Signal | Error | The peak intensity of the profile is below a predetermined threshold, indicating an unacceptable S/N ratio. |
| 850E → | Saturated Signal | Warning / Error | The profile includes a number of saturated pixels that exceeds a predetermined limit, indicating improper measurement conditions. (The user may elect to have this criteria treated as an error or a warning, by sending a command to the CRS electronics.) |
| 850F → | Algorithm Overflow | Error | A DSP accumulator overflowed, indicating improper signals processing conditions. |
| 850G → | Adjusting Duty Cycle | Warning | An intensity adjustment (e.g. lighting or detector gain) was not stabilized prior to profile acquisition, indicating potentially improper measurement conditions. |
| 850H → | Abnormally Asymmetric Peak Region | Warning | A peak region asymmetry characterization (e.g. a peak pixel vs. distance indicating coordinate comparison) is indicative of an abnormal or unexpected profile (e.g. exceeds a predetermined threshold), indicating potentially improper measurement conditions. |
| 850I → | Errors During Averaging | Warning | When operating in averaging mode, a number of "error" and/or "warning" type measurement points in a sample was below a predetermined %, so they were ignored, and the measurement average was based on remaining points. |
| 850J → | Errors During Averaging | Error | When operating in averaging mode, the number of "error" and/or "warning" type measurement points in the sample exceeded a predetermined %, indicating unacceptable measurement conditions. |

CHROMATIC RANGE SENSOR INCLUDING MEASUREMENT RELIABILITY CHARACTERIZATION

FIELD OF THE INVENTION

The invention relates generally to precision measurement instruments, and more particularly to chromatic range sensors and similar optical distance determining devices, and their use.

BACKGROUND

It is known to use chromatic confocal techniques in optical height or distance or range sensors. As described in U.S. Pat. No. 7,876,456 (the '456 patent), which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture, and so will not couple much power into the fiber. Therefore, for the light returned through the fiber, the signal level will be greatest for the wavelength corresponding to the surface height or distance to the surface. A spectrometer type detector measures the signal level for each wavelength, in order to determine the surface height.

The '456 patent further describes that certain manufacturers refer to practical and compact systems that operate as described above, and that are suitable for chromatic confocal ranging in an industrial setting, as chromatic point sensors (CPS) or chromatic line sensors, or the like. A compact chromatically-dispersive optical assembly that is used with such systems that measure the distance to a surface point is referred to as an "optical pen" or a "pen." The optical pen is connected through an optical fiber to an electronic portion of the chromatic point sensor which transmits light through the fiber to be output from the optical pen and which provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength position coordinate" as indicated by a peak or centroid of the intensity profile, and the resulting pixel coordinate of the peak or centroid is used with a lookup table to determine the distance to the surface. This pixel coordinate may be determined with sub-pixel resolution, and may be referred to as the "distance-indicating coordinate."

The '456 patent further describes that in normal operation the CPS spectrometer ordinarily receives a certain range or peak region of wavelengths for a certain measurement distance. It is disclosed that the CPS spectrometer may distort the shape of the peak region of wavelengths, and thus influence the corresponding peak or centroid and the resulting distance-indicating coordinate. The systems and methods of the '456 patent provide component calibration data, also referred to as compensation data, that encompasses the effects of wavelength-dependent variations (e.g., non uniform responses) in the CPS spectrometer, and/or the CPS broadband light source. The compensation data of the '456 patent is used to reduce or eliminate errors associated with these effects in the spectrometer and light source. The compensation data of the '456 patent may be redetermined and/or replaced at various points in time, such that the compensation data remains effective to reduce or eliminate errors despite changes in the spectrometer and/or light source characteristics (e.g., due to component aging, environmental variations, or the like).

U.S. Patent Pre-Grant Publication No. 2010/0188742, which is hereby incorporated herein by reference in its entirety, discloses a chromatic range sensor which is a "line sensor" that uses a slit aperture and focuses light along a line rather than a point, providing the capability to measure a distance to a surface at a number of points along that line.

In chromatic range sensor systems, certain conditions or events may occur that may affect the reliability of the measurement data that is used for determining a distance to a surface. As one specific example, in various chromatic range sensor systems, there is nothing to prevent the detection of more than one spectral peak based on the light reflected from an intended measurement location. In some cases, this is advantageous for measuring the thickness of a transparent thin film. That is, a first spectral peak may correspond to a first distance to the top surface of a transparent film, and a second spectral peak may correspond to a second distance to the bottom surface of that film and/or the surface of the substrate that carries it. However, in other cases, two spectral peaks may occur unpredictably (e.g., due to an unexpected secondary reflection that passes back through a primary or intended measurement location). This may lead to an unexpected and/or erroneous measurement result (e.g., measurement errors that are a significant portion of the measurement range, for example). Providing an improved chromatic range sensor system including a means to address conditions and/or events that may cause measurement errors due to an unpredictable second peak and/or other causes would be desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for enhancing the utility of workpiece height measurements determined by a chromatic range sensor (CRS) system is provided. In one embodiment, the CRS system may comprise a chromatic point sensor system and the optical element may comprise an optical pen. In one implementation, the method includes providing CRS measurement data reliability criteria that define at least 3 predetermined measurement data reliability categories of CRS measurement data reliability, including at least one reliability criterion related to the shape of measurement spectral intensity profile data. In this way, a user or host system may be alerted to potential errors in measurements (e.g., errors due to unwanted secondary reflections from a workpiece). This is especially valuable for relatively unskilled users, who may not understand the potential for such errors. It may also be valuable for relatively skilled users who wish to determine which measurement locations and/or measurements in an automated sequence result in unexpected measurement errors. In various embodiments, the CRS system is operated to provide a set of measurement data, wherein the set of measurement data comprises measurement spectral intensity profile data corresponding to a respective workpiece height measurement at a location on a workpiece. A workpiece height measurement is determined based on determining a spectral peak indicated by the measurement spectral intensity profile data. A measurement data reliability category is determined for the set of measurement data based on the CRS measurement data reliability criteria. The CRS system may then provide the determined workpiece height measurement and the corresponding determined measurement data reliability category. In one embodiment, metadata may be stored with the determined workpiece height measurement which indicates the corresponding determined measurement data reliability category.

In various embodiments, the respective reliability categories may correspond to a state including one of: an abnormally asymmetric peak region of a spectral peak; a saturated spectral peak; a duty cycle of the chromatic confocal point sensor having been adjusted during measurement; a distance-indicating coordinate (e.g., a signal centroid) of a spectral peak being out of an acceptable measurement range; a peak intensity of a spectral peak being below a threshold; and an accumulator of the control system having overflowed.

The at least one reliability criterion related to the shape of measurement spectral intensity profile data may be configured to identify abnormal asymmetry of the peak region of the measurement spectral intensity profile data. The identification of the abnormal spectral profile asymmetry may include identifying abnormal spectral profile asymmetry arising from light reflected from more than one portion of a workpiece surface (e.g., light reflected by the front and back surfaces of a thin film, or unexpected secondary reflection light that passes back through a measurement location that is intended to provide the primary reflection light as the basis for a measurement). In one embodiment, the abnormal asymmetry shape criterion may include determining a difference between a peak pixel and a centroid of the peak region. The shape criterion may be evaluated in real time during a single measurement cycle which comprises the operation of the CRS system to provide the corresponding set of measurement data.

The step of determining the measurement data reliability category for the set of measurement data based on the CRS measurement data reliability criteria may be performed by the CRS system, and in certain implementations may be performed automatically. The categorization of the measurement data reliability may be provided internally to the CRS system each cycle. The categorization may be output based on an output data selection determined by a user.

The steps of operating the CRS system to provide a set of measurement data, determining a workpiece height measurement, determining a measurement data reliability category, and providing the determined workpiece height measurement and the corresponding determined measurement data reliability category, may be performed repeatedly. The repeated performance of the steps may be done at a measurement rate of the CRS system.

The CRS system may further be operated to provide a plurality of sets of measurement data and the reliability criteria may be evaluated for each set of measurement data. A user interface may display a plurality of workpiece height measurements with indicators of the corresponding determined measurement data reliability categories, wherein the indicators may comprise at least one of a unique shape or color.

At least one of the 3 predetermined measurement data reliability categories may be classified as being a type of warning, which indicates that a workpiece height measurement has been, or can still be, determined with some risk of error, and at least one may be classified as being a type of error, which indicates that a workpiece height measurement has not been, or cannot be, reliably determined. In some embodiments, at least one measurement data reliability category that is defined by the reliability criterion related to the shape of the measurement spectral intensity profile may be classified as being a type of warning.

Related features and functions are also described in a commonly assigned U.S. patent application titled "Method for Identifying Abnormal Spectral Profiles Measured by a Chromatic Confocal Range Sensor" (Attorney Docket No. 13/405214), which was filed concurrently with the present application, and which is hereby incorporated by reference in its entirety.

It should be appreciated that it is not conventional in CRS systems to provide both a measurement (or measurement data) and a reliability category for that measurement (or measurement data) that is based on an analysis of data and/or operations that are ordinarily internal to the CRS system (e.g., in contrast to geometric outlier criteria that are based on post-processing of a number of data points). Such a combination of information may be helpful diagnostic information, for improving automated CRS measurement routines, and understanding problematic measurement locations on workpieces, among other uses. In addition, it should be appreciated that CRS systems are computationally intensive, and a high measurement rate may require a high degree of pipelining of operations and/or synchronous operations that exclude conditional operations. Therefore, it may be useful to process and/or output a measurement at a desired high rate, regardless of its reliability, and then categorize the reliability of that measurement as a separate processing and/or output operation. The various systems and methods disclosed herein are useful for these reasons, and others.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4B is a diagram of a CRS distance calibration lookup table for referencing distance-indicating coordinates to measurement distances for a chromatic point sensor;

FIG. 8 is a diagram of a table illustrating example measurement data reliability categories and corresponding reliability criteria;

DETAILED DESCRIPTION

Figure 1:
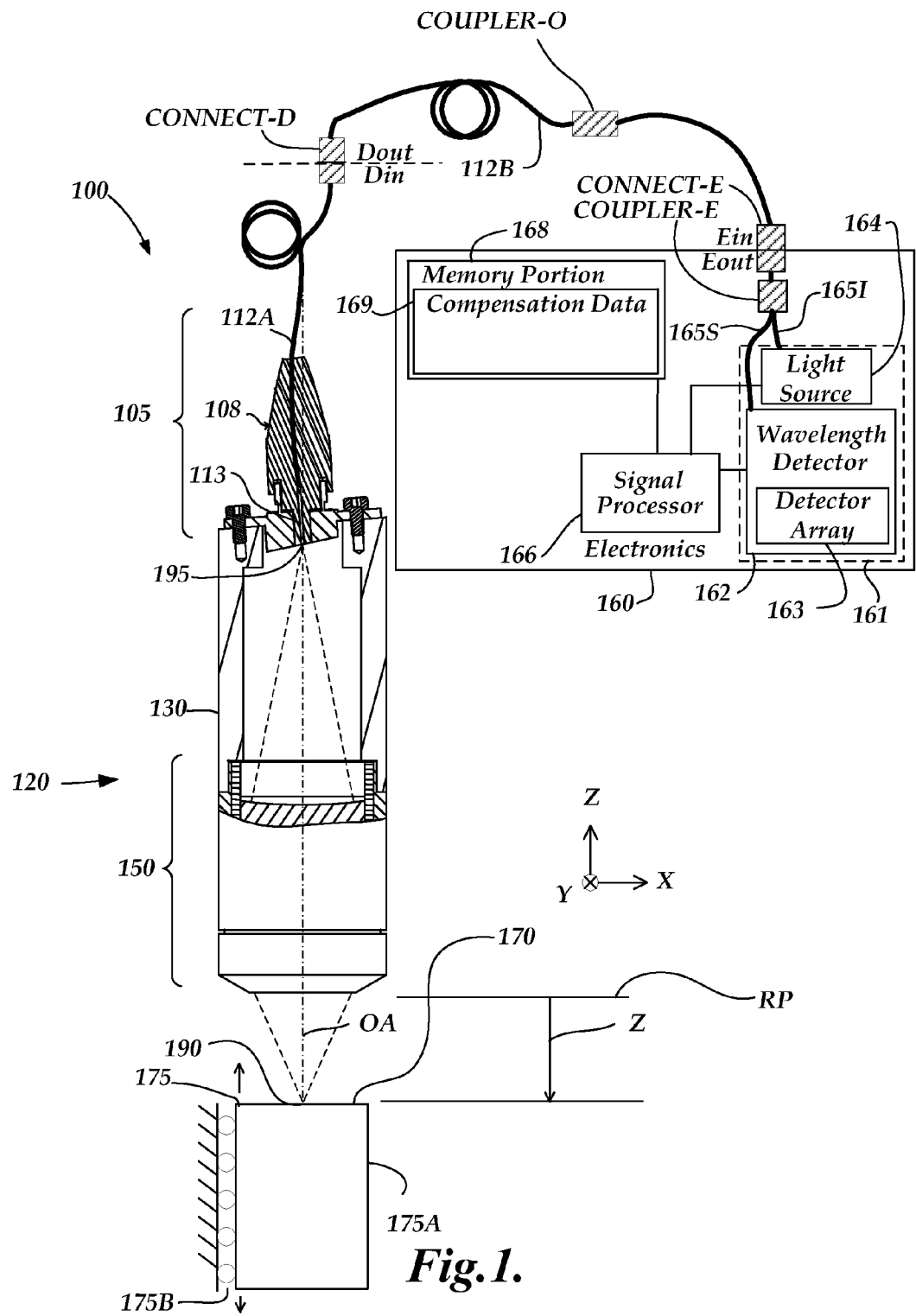
FIG. 1 is a block diagram of one embodiment of an exemplary chromatic range sensor (CRS) system.

FIG. 1 is a block diagram of one exemplary embodiment of a chromatic range sensor (CRS) system 100. As shown in FIG. 1, the CRS system 100 includes an optical element 120 and an electronics portion 160. In the embodiment shown in FIG. 1, the electronics portion 160 includes a signal processor 166, a memory portion 168 and a source+detector subsystem 161 comprising a wavelength detector 162, and a broadband light source 164 (also referred to as a white light source, in some embodiments). It should be appreciated that the CRS system 100 shown in FIG. 1 is a chromatic point sensor system which measures at a single measurement point at a time. The optical element 120 shown in FIG. 1 is an optical pen. However, in various embodiments alternative types of chromatic range systems, such as a chromatic line sensor, may be configured to operate according to the systems and methods disclosed herein. In various embodiments, the wavelength detector 162 includes a detector array 163 of a spectrometer. The detector array 163 may comprise a plurality of pixels distributed along a measurement axis of the wavelength detector 162, the plurality of pixels receiving respective wavelengths and providing output spectral profile data. The electronics portion 160 is coupled to the optical element 120 through an optical path including the fiber optic cable 112. In the embodiment shown in FIG. 1, optional or alternative aspects of the optical path are shown, including the fiber optic cable 112 having first and second segments 112A and 112B joined at a connector CONNECT-D in the fiber optic segment 112B, and a coupler COUPLER-O which joins the segment 112B to the electronics portion 160. The light source 164 is connected to input a spectral profile of wavelengths to the fiber optic cable 112. The optical element 120 includes an in/out fiber optic sub-assembly 105, a housing 130, and an optics portion 150. The in/out fiber optic sub-assembly 105 comprises an in/out optical fiber 113 carried through a fiber optic cable 112 which encases it, and a fiber optic connector 108. The in/out optical fiber 113 outputs an output beam through an aperture 195, and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for CRS systems. As will be described in more detail below, during measurement operations, the light is focused on a surface location 190 of a workpiece 170. Upon reflection from the surface location 190, the light is refocused by the optics portion 150 onto the aperture 195. Due to the axial chromatic dispersion provided by the optics portion 150, only one wavelength will have the focus distance that matches the measurement distance "Z," which is the distance from a reference position RP that is fixed relative to the optical element 120 to the surface location 190. The CRS system 100 is configured such that the wavelength that is best focused at the surface location 190 will also be the wavelength that is best focused at the aperture 195. The aperture 195 spatially filters the reflected light such that predominantly the best focused wavelength passes through the aperture 195 and into the core of the optical fiber 113 of the optical fiber cable 112. As will be described in more detail below, the optical fiber cable 112 routes the signal light to a wavelength detector 162 that is utilized for determining the wavelength having the dominant intensity, which corresponds to the measurement distance Z to the surface location 190.

During normal measurement operations, the broadband light source 164, which is controlled by the signal processor 166, is coupled to the CRS optical element 120 through a fiber optic path including the illumination fiber segment 165I, the 2×1 coupler COUPLER-E, CONNECT-E, and the fiber optic cable 112. As described above, the light travels through the optical element 120 which produces longitudinal chromatic aberration. The wavelength of light that is most efficiently transmitted back through the aperture 195 and into the fiber optic cable 112 is the wavelength that is in focus on the surface location 190. The reflected wavelength-dependent light intensity then passes back through the fiber optic path to the electronics portion 160 and the coupler COUPLER-E so that approximately 50% of the light is directed through the signal fiber segment 165S to the wavelength detector 162. The wavelength detector 162 receives the wavelength-dependent light intensity, converts it to an output spectral intensity profile (also referred to simply as an output spectral profile) distributed over an array of pixels along a measuring axis of the detector array 163, and operates to provide corresponding output spectral profile data based on pixel data output from the detector array 163.

The subpixel-resolution distance-indicating coordinate (DIC) of the profile data is calculated by the signal processor 166 and the DIC determines the measurement distance Z to the surface location 190 via a distance calibration lookup table or the like, which is stored in the memory portion 168, as will be described in more detail below with respect to FIGS. 4A and 4B. The distance-indicating coordinate may be determined by various methods described further below (e.g., by determining the centroid of profile data included in a peak region of the profile data). When the distance-indicating coordinate is determined during calibration operations, it may be referred to as a calibration distance-indicating coordinate, and when it is determined during workpiece surface measurement operations, it may be referred to as a measurement distance-indicating coordinate. The profile data used to determine the subpixel distance-indicating coordinate is described in greater detail below.

FIG. 1 includes orthogonal XYZ coordinate axes, as a frame of reference. The Z direction is defined to be parallel to the optical axis, or distance-measuring axis, of the optical element 120. As illustrated in FIG. 1, during operation, the workpiece 170 is placed along the optical axis OA of the optical element 120. In one embodiment, the workpiece 170 is aligned and mounted on a translation stage 175 which may be advantageously aligned such that it translates along the Z axis direction constrained by guide bearings 175b, with its surface 175A nominally parallel to the XY plane. Other exemplary features and operations of the CRS system 100 will be described in more detail below.

Figure 2:
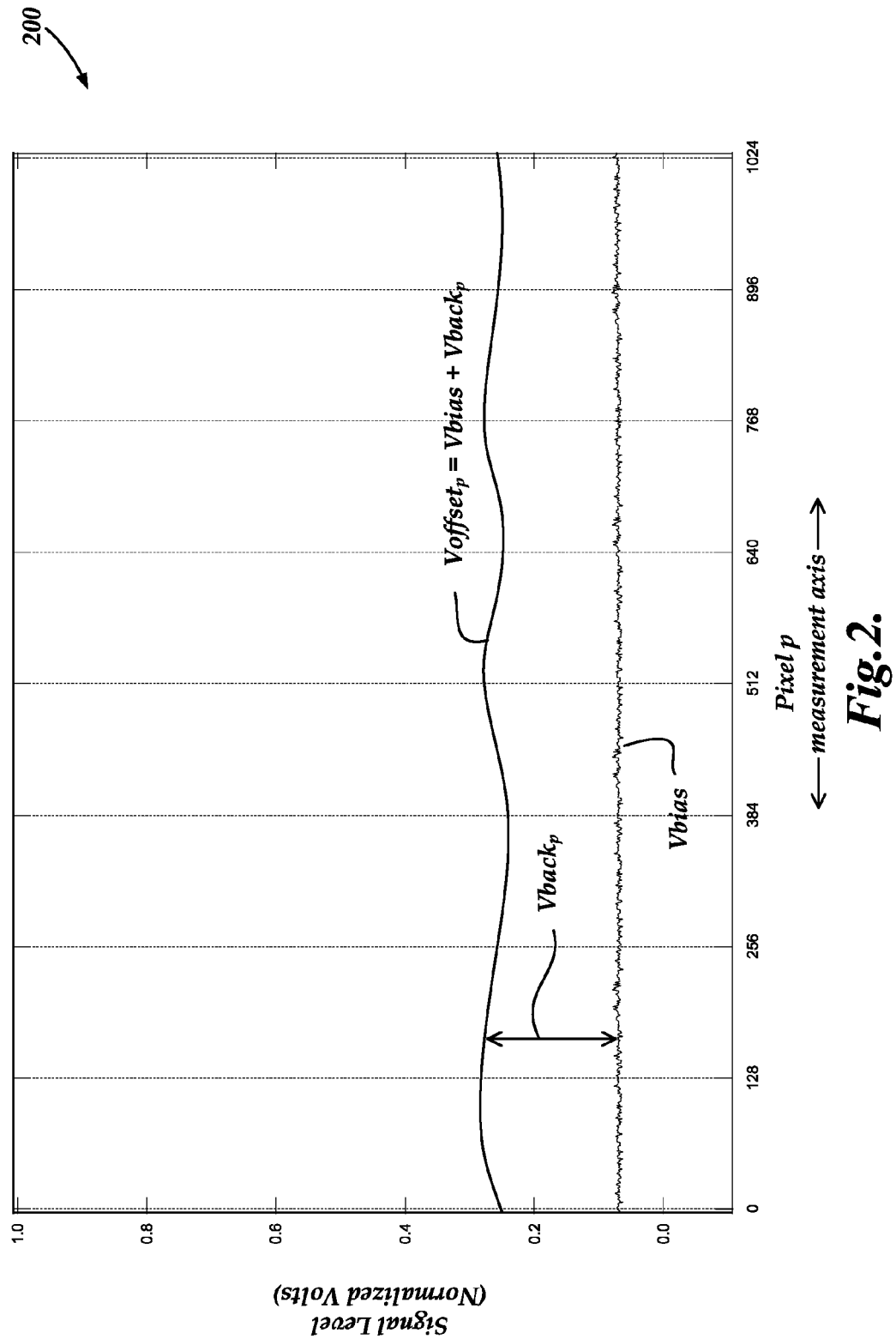
FIG. 2 is a diagram of profile data from a CRS illustrating voltage offset signal levels for the pixels in a detector array.

The following description of FIG. 2 outlines certain known background signal processing and/or calibration operations that may be used in combination with this invention, in various embodiments. The purpose of this description is to emphasize that the inventive methods disclosed further below are distinct from, but compatible with, these operations. FIG. 2 is a diagram 200 of profile data from a CRS illustrating voltage offset signal levels Voffset(p) for the pixels in a detector array 163 when no measurement surface is present (e.g., when the surface location 190 of the workpiece 170 of FIG. 1 is not present), such that there is no intentionally reflected light and no significant dominant wavelength peak in the resulting intensity profile. As shown in FIG. 2, the voltage offset signal Voffset(p) is plotted in normalized volts, for each of 1,024 pixels. "Normalized volts" assigns a value of 1.0 to the saturation voltage of the detector array 163. The voltage offset signal Voffset(p) includes a bias signal level Vbias, which is shown as unvarying across the array, and a background signal component Vback(p), which is shown as being dependent upon the pixel coordinate p across the array. The variable background signal Vback(p) represents signals such as background light from wavelength-dependent spurious reflections and the like in the CRS, as well as due to the dark current of the various pixels p. In various embodiments, it is advantageous if the signal components Vback(p) (or signals that show the same variation, such as the voltage offset signals Voffset(p)) are stored in the compensation data 169 for calibration or compensation of the pixel array of the detector array 163, and used to compensate all subsequent profile data signals from each pixel p (e.g., by subtraction), on an ongoing basis. Thus, it will be understood that the background signal component Vback(p) is assumed to be compensated in a known manner, and it is not necessary that it be further explicitly considered or described in relation to the various intensity profiles or signal processing operations, or the like, described below.

In contrast to the background signal component Vback(p), which may be relatively stable over time, the coordinate-independent bias signal level Vbias may change as a result of voltage drifts associated with ambient temperature changes and heat generated by the electronics portion 160 during operation.

Figure 3:
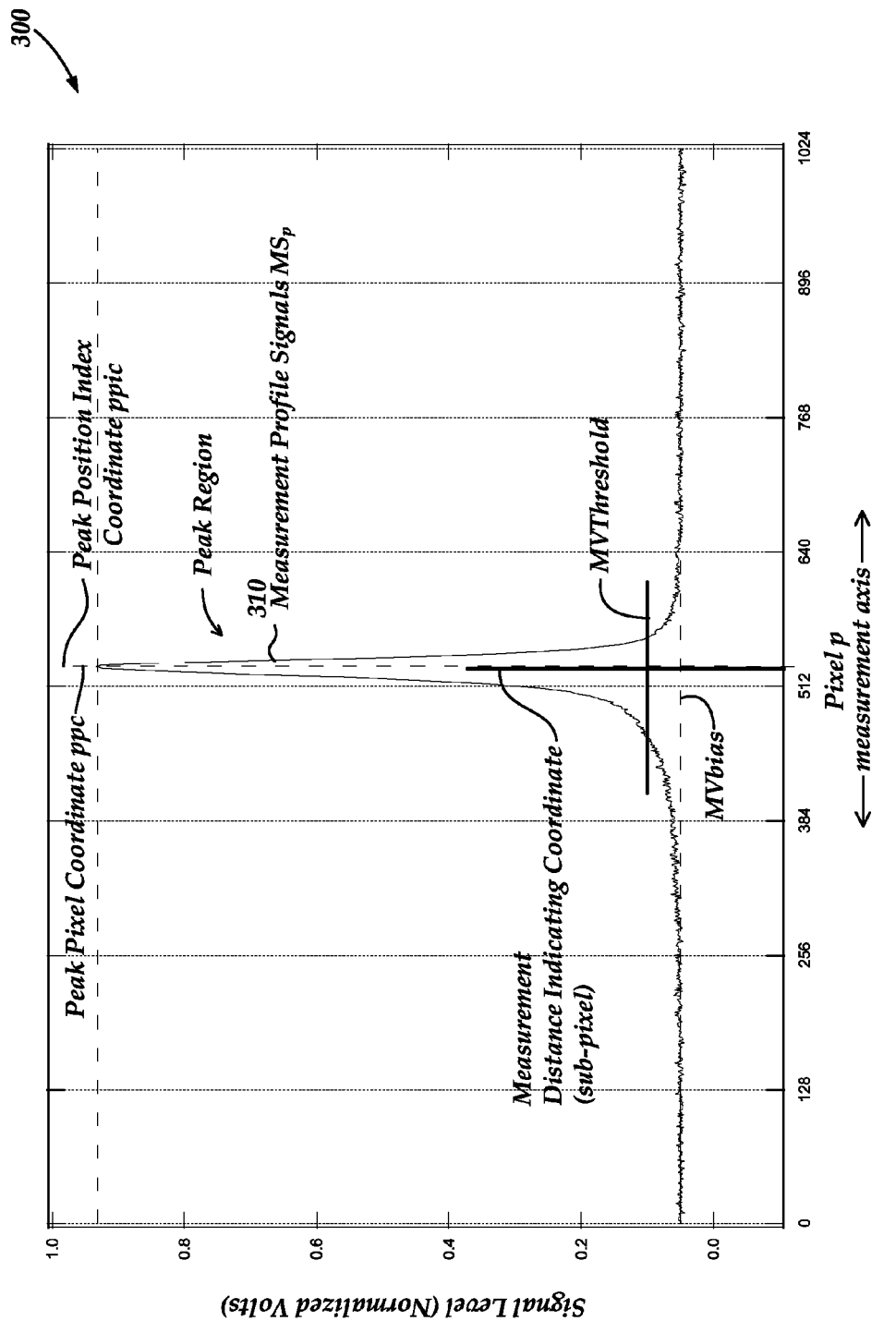
FIG. 3 is a diagram of profile data from a CRS illustrating a normal peak region signal corresponding to a reliable measurement distance-indicating coordinate.
Figure 4A:
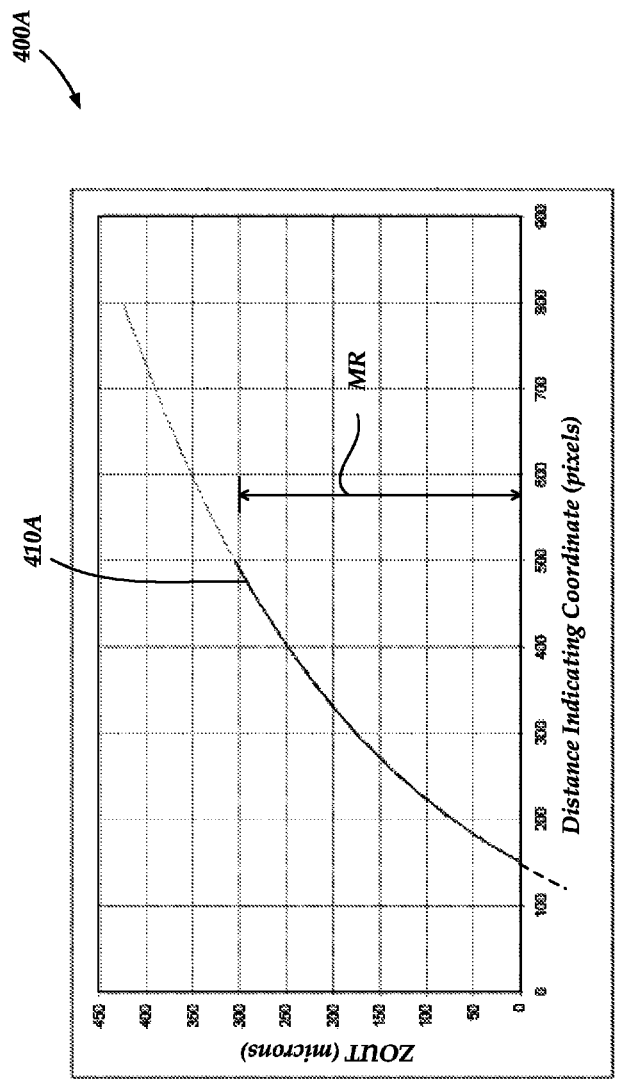
FIG. 4A is a diagram of CRS distance calibration data which correlates known measurement distances with distance-indicating coordinates for a chromatic point sensor.

The following description of FIGS. 3, 4A, and 4B outlines certain signal processing operations that determine distance-indicating coordinates based on a distance indicating subset of the profile data that is dynamically adapted to compensate for changes in the contemporaneous bias signal level Vbias, resulting in more repeatable distance measurements. The operations outlined herein are described in more detail in the '456 patent, and in U.S. Pat. No. 7,990,522 (the '522 patent), which is hereby incorporated herein by reference in its entirety. The purpose of this description is to provide background information which is useful for an overall understanding of CRS distance measurement operations.

FIG. 3 is a diagram 300 of profile data 310 (measurement profile signal data) from a CRS detector (e.g., detector 162), as acquired during CRS measurement operations, either during certain optical element or overall system calibration operations or during regular measurement operations. The profile data 310 illustrates a normal peak region signal which is relatively symmetric and corresponds to a reliable measurement distance-indicating coordinate. The profile data 310 may also be referred to as the profile signals MS(p), where MS(p) is the signal level (shown in normalized volts) associated with each pixel p of a detector array (e.g., the detector array 163). The graph 300 of FIG. 3 is created with a target surface (e.g., the surface 190) positioned at some distance along the optical axis OA of the optical element 120, producing the corresponding measurement profile data 310 having the dominant wavelength peak region shown in FIG. 3.

FIG. 3 shows a bias signal level MVbias (in normalized volts), a peak pixel coordinate ppc, a peak position index coordinate ppic, and a data threshold MVthreshold that defines the lower limit of a distance-indicating subset of the data in the peak region. All "MV" values are in normalized volts. FIG. 3 also shows a distance-indicating coordinate (DIC) that is determined based on the distance-indicating subset of the data in the calibration spectral peak region. As described in the '522 patent, MVthreshold may be an index-specific threshold, MVthreshold(ppic), in some embodiments.

Briefly, in one embodiment, measurement operations for determining a distance-indicating coordinate (e.g., a distance-indicating coordinate DIC, as described relative to the profile data 310), may include the following:

Positioning the target surface along the optical axis OA, and capturing the resulting profile data 310.

Determining the peak pixel coordinate (that is, the pixel having the highest signal).

Determining the peak position index coordinate ppic, which is the index for storing and retrieving certain calibration data (e.g., index-specific threshold calibration data). This may be the same as the peak pixel coordinate in some embodiments.

Determining the measurement bias signal level MVbias.

Determining the data threshold MVthreshold (e.g., as a percentage of the peak height, or based on index-specific threshold calibration data that corresponds to the current peak position index coordinate ppic).

Determining the distance-indicating coordinate DIC with sub-pixel resolution, based on the distance-indicating subset of the data that has a value greater than MVthreshold in the measurement peak region.

For a distance calibration measurement, independently determining the corresponding distance to the target surface with a desired accuracy (e.g., by interferometer), and determining a distance calibration data point in a distance calibration table or curve (e.g., a distance calibration table or curve such as that represented by the distance calibration data 410, shown in FIG. 4A).

For a normal workpiece distance measurement, determining the measurement distance by correlating the measurement DIC with a corresponding distance in the stored distance calibration data (e.g., a distance calibration table or curve such as that represented by the distance calibration data 410, shown in FIG. 4A).

In the foregoing operations, the distance-indicating coordinate DIC may be determined with sub-pixel resolution, based on the distance-indicating subset of data above MVthreshold. A measurement DIC may be determined according to one of a number of different methods. In one embodiment, a measurement DIC may be determined as the subpixel-resolution coordinate of a centroid $X_C$ of the distance-indicating subset of data. For example, for a detector with 1024 pixels, the centroid $X_C$ may be determined according to:

$$X_C = \frac{\sum_{p=1}^{1024} p(S_M(p))^n}{\sum_{p=1}^{1024} (S_M(p))^n} \quad \text{(Eq. 1)}$$

where, $$S_M(p) = \quad \text{(Eq. 2)}$$
$$\begin{cases} MS_p - MVThreshold(ppic), & \text{for } MS_p \geq MVThreshold(ppic) \\ 0, & \text{for } MS_p < MVThreshold(ppic) \end{cases}$$

In one specific example, n=2, in EQUATION 1. It will be appreciated that EQUATION 2 restricts the data used in the centroid calculation to a distance-indicating subset of data. When the distance-indicating coordinate DIC is determined during calibration operations, it may be referred to as a calibration distance-indicating coordinate, as well as a measurement distance-indicating coordinate.

FIG. 4A is a diagram 400A of CRS measurement distance calibration data 410A which correlates known or calibrated measurement distances ZOUT (in microns) along the vertical axis with distance-indicating coordinates (in units of pixels) along the horizontal axis, for the CRS system 100, or the like. The example shown in FIG. 4A is for an optical element having a specified measurement range MR of 300 microns, which corresponds to calibration distance-indicating coordinates in the range of approximately 150-490 pixels. However, the chromatic range sensor 100 may be calibrated over a larger pixel range of the detector array 163, if desired. The reference or "zero" ZOUT distance is somewhat arbitrary, and may be set at a desired reference distance relative to the optical element 120. Although the distance calibration data 410A appears to form a smooth curve, it should be appreciated that the distance calibration data for a typical prior art CRS system, particularly for economical CRS systems, may exhibit short range errors or irregularities.

In some embodiments, the CRS measurement distance calibration data 410A may be determined and/or used as outlined above with reference to FIG. 3. One exemplary laboratory calibration method is briefly outlined here, to further clarify the nature of the CRS distance calibration data 410A. Briefly, a mirror may provide a calibration surface (e.g., substituting for the surface 190 of FIG. 1) along the optical axis OA of the CRS optical element. The displacement of the mirror may be controlled in approximately 0.1 or 0.2 micron steps. For each step, the actual mirror position or displacement is acquired using a reference standard, such as an interferometer. For each actual mirror position, the corresponding calibration distance-indicating coordinate (DIC) of the CRS is determined, based on the corresponding intensity profile data provided by the CRS detector (e.g., as outlined previously). The calibration distance-indicating coordinate and the corresponding actual position are then recorded to provide the calibration data 410A.

Later, during measurement operations, to provide a distance measurement for a workpiece surface (e.g., surface 190 of FIG. 1), the workpiece surface is positioned along the optical axis OA of the CRS optical element. The measurement distance-indicating coordinate of the CRS is determined, based on the measurement distance-indicating coordinate determined from the intensity profile data provided by the CRS detector. Then, the distance calibration data 410A is used to determine the CRS measurement distance ZOUT that corresponds to that specific measurement distance-indicating coordinate.

FIG. 4B is a diagram 400B of a chromatic range sensor distance calibration lookup table 410B for referencing distance-indicating coordinates to measurement distances for a chromatic point sensor. It will be appreciated that the table values of FIG. 4B are intended to be illustrative only, and may not correspond to specific values indicated in other examples (e.g., the specific table values of FIG. 4B may differ from those indicated in the specific calibration data 410A of FIG. 4A, although it will be appreciated that the concepts are analogous). As shown in FIG. 4B, in the left column the calibration DIC entries cover the pixel coordinates from 1 to 1,024, in increments of 0.1 pixel steps, and in the right column the corresponding measurement distances (in microns) are entered. During a workpiece measurement operation, the measurement DIC calculated by the chromatic point sensor is referenced to the stored calibration lookup table in order to determine the measurement distance corresponding to the measurement DIC. If the measurement DIC falls between adjacent calibration DIC values, then the measurement distance corresponding to the measurement DIC is determined by interpolation.

A data generating routine for generating calibration DICs corresponding to known measurement distances, in 0.1 or 0.2 micron increments, has been previously outlined with reference to FIG. 4A. For each known measurement distance, the corresponding calibration DICs may be determined and stored as outlined above with reference to FIG. 3. That data may then be interpolated (if necessary) to provide the entries shown in the lookup table 410B, in pixel coordinate increments of 0.1 pixels.

It should be appreciated that calibration data such as that utilized in FIGS. 4A and 4B is collected using a well behaved surface (e.g., a mirror) and under relatively ideal conditions, which results in the calibration data being highly reliable. In relation to this concept, the profile data 310 shown in FIG. 3, when measured during calibration operations, is done under certain ideal conditions and results in certain ideal characteristics (e.g., the profile data has a relatively symmetric peak region, the peak intensity is high enough that a reliable position value can be determined, the pixel position of the profile centroid falls within the specified range indicated in the table 410B, the profile is not saturated, an accumulator of a DSP has not overflowed, a duty cycle was not being adjusted during the calibration measurement, etc.).

However, during certain regular non-calibration measurement operations, certain of these types of ideal conditions and characteristics may not exist or may be altered, such as may affect the reliability of the measurement data. As will be described in more detail below, in accordance with the methods described herein, in order to provide an indication of when measurement data has been acquired with certain less than ideal conditions or characteristics, reliability categories may be provided with the measurement data. In other words, certain circumstances or characteristics (e.g., an abnormally asymmetric peak region, not enough signal, a saturated signal, an algorithm overflow, an adjustment of a duty cycle during measurement, etc.) may define various reliability categories that may be provided with the measurement data. As will be described in more detail below, in certain embodiments, such reliability categories may be associated with specified reliability indicators (e.g., graphical indicators wherein each measurement point on a schematic surface profile includes an indicator of the reliability of the measurement data that was utilized to determine the measurement point, etc.). Such measurement data reliability categories may be utilized for various purposes (e.g., allowing a user to decide to filter out measurement data that is associated with certain reliability categories, making adjustments to the setup to achieve improved measurements, etc.). As a specific example of determining when a specified reliability category should be associated with measurement data, a specific "abnormally asymmetric peak region" reliability category will be described in more detail below with respect to FIGS. 5-7.

Figure 5:
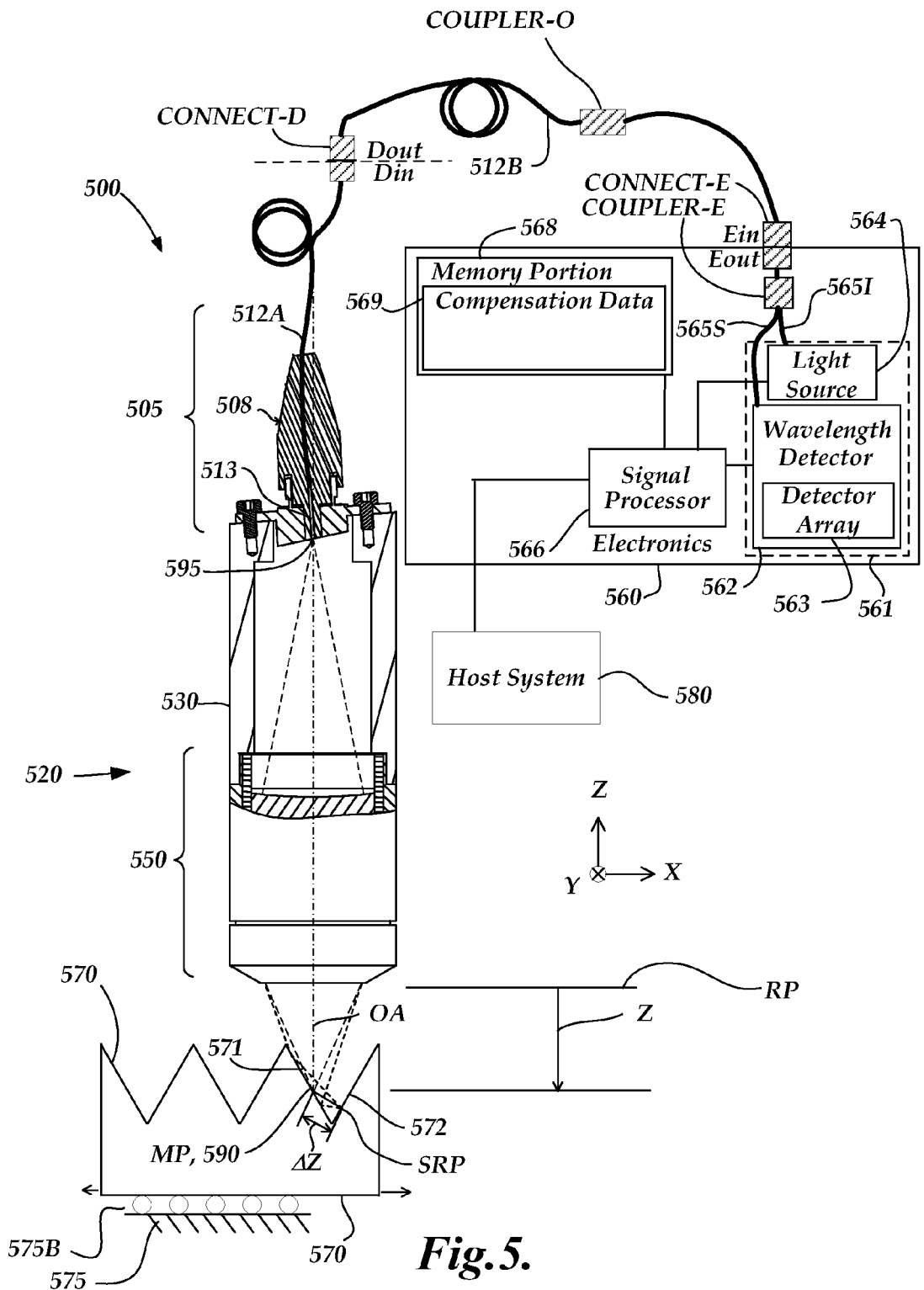
FIG. 5 is a diagram of an embodiment of an exemplary CRS system applied to measure a surface that may produce spectral profiles to which a number of measurement data reliability categories may apply.

FIG. 5 is a diagram of an exemplary embodiment of a CRS system 500 applied to measure a schematically illustrated surface that may produce spectral profiles to which a number of measurement data reliability categories may apply (e.g., as will be described in more detail below with respect to FIG. 9). However, for purposes of the present example, only the spectral profiles related to a single measurement data reliability category (i.e., an abnormally asymmetric peak region) will be described. The CRS system 500 comprises elements which are similar to the CRS system 100 of FIG. 1. It will be appreciated that similarly numbered elements 5XX are similar or identical to elements 1XX of FIG. 1 and only those elements which are significantly different are outlined with respect to FIG. 5.

As shown in FIG. 5, in some embodiments, the CRS electronics 560 may be connected to a host system 580 which may receive and/or exchange control signals and data with the CRS electronics 500. It will be appreciated that in various embodiments, the operations of the systems and methods disclosed herein, such as analyzing output spectral profile data to determine associated measurement data reliability categories, may be performed in either the CRS electronics 560 or the host system 580. In one embodiment, the host system 580 may include automatic motion control (e.g., as in a machine vision inspection system, etc.) and may define and execute part programs that operate the CRS system 500 in the role of a non-contact measurement probe to perform inspection operations.

As shown in FIG. 5, the CRS system 500 is used to measure the surface of a workpiece 570 (e.g., screw threads) at an intended measurement point MP having a surface location 590. In one embodiment, the workpiece 570 is aligned and mounted on a translation stage 575 which may be advantageously aligned such that it translates along the X-axis direction constrained by guide bearings 575B, in order to acquire surface profile measurements such as those illustrated in FIG. 7, described further below. The workpiece 570 comprises a surface face 571 and a surface face 572 (which may be relatively reflective metal screw thread surfaces, for example). The CRS system 500 is positioned to measure a Z height at the intended measurement point MP on the face 571. As indicated by the dashed lines which represent focused wavelengths which contribute to the output spectral profile, the intended measurement point MP provides a primary reflection of a portion of the measurement beam comprising a first wavelength, which contributes a first wavelength peak to the output spectral profile. However, a significant portion of the measurement beam is reflected from the face 571 and continues on to the face 572. That portion of the measurement beam includes a second wavelength that is focused on and reflected from a secondary reflection point SRP the face 572, back to the face 571 which reflects that second wavelength back along the optical axis to contribute a second wavelength peak to the output spectral profile in the CRS system 500.

Figure 6:
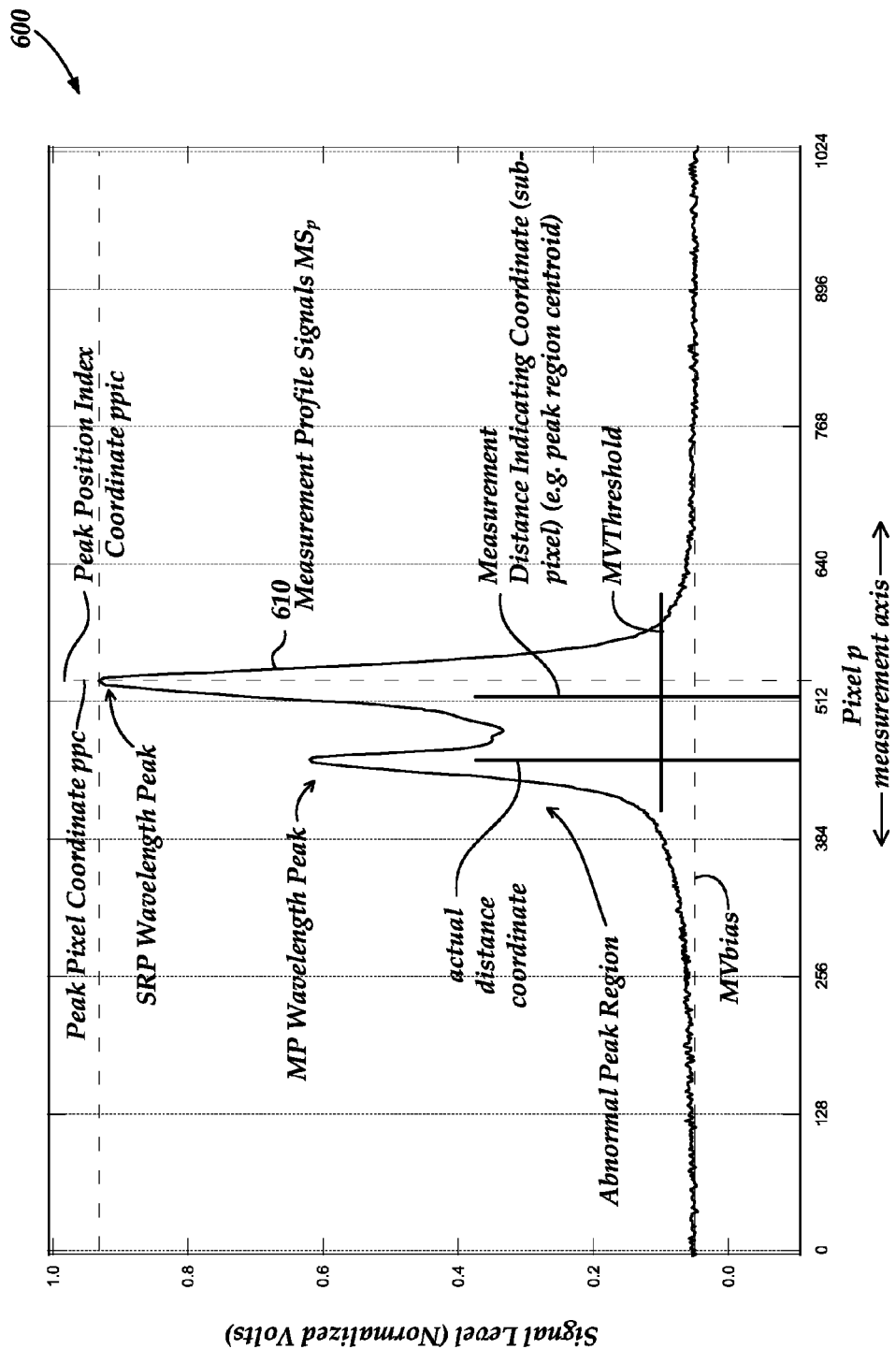
FIG. 6 is a diagram of abnormal spectral profile data from a CRS, illustrating an abnormally asymmetric peak region signal and an erroneous measurement distance indicating coordinate resulting from combined primary and secondary reflections.

As shown in FIG. 5, the secondary reflection point SRP has a measurement path length difference $\Delta Z$ relative to the intended measurement point MP. When the measurement path length difference $\Delta Z$ is large enough it results in a clearly defined secondary peak in profile data associated with this measurement point, as illustrated in FIG. 6. When the measurement path length difference $\Delta Z$ is smaller, the secondary peak may be so close to the primary peak that they simply combine to form an abnormally distorted and/or asymmetric peak region. In the example shown in FIG. 5, the schematically illustrated surface 570 has a surface profile similar to a screw thread, but it should be appreciated that similar secondary reflection effects may occur during measurement operations for other types of workpiece features, such as narrow holes or trenches, or the like.

FIG. 6 is a diagram 600 of abnormal profile data 610 from the CRS system 500, illustrating an abnormally asymmetric peak region signal and an erroneous measurement distance-indicating coordinate resulting from combined primary and secondary reflections. The profile data of FIG. 6 may correspond to the measurement situation illustrated in FIG. 5, for example. As shown in FIG. 6, the abnormally asymmetric peak region of the profile data 610 includes an MP wavelength peak and an SRP wavelength peak. The MP wavelength peak in the output spectral profile data corresponds to radiation focused on and reflected at the intended measurement point MP on the face 571, whereas the SRP wavelength peak corresponds to radiation focused on and reflected at the secondary reflection point SRP on the face 572.

It may be noted that the SRP wavelength peak exhibits a stronger signal level than that of the MP wavelength peak. This is because little radiation is reflected from the intended measurement point MP to the CRS system due to its angle of incidence on the face 571 and a surface finish that is highly polished, resulting in a more specular reflection, whereas much radiation is reflected at approximately normal incidence at the secondary reflection point SRP, and then mostly returned to the CRS system by subsequent reflection at the face 571. An abnormally asymmetric peak region may or may not include this particular anomalous effect. In any case, a normal peak region is relatively symmetric and identifying the representative wavelength peak for such a peak region using a fast processing method such as a centroid method or a relatively simple curve fitting method, or the like, may provide repeatable and reliable measurement results for a CRS system. However, such fast processing methods do not provide repeatable and reliable measurement results for abnormally asymmetric peak regions, which violate the assumptions of the fast processing methods and the assumptions used for calibration. For example, as shown in FIG. 6 the actual distance coordinate for the measurement point MP should be in the vicinity of the MP wavelength peak near pixel 456. However, when using a centroid method (e.g., EQUATION 1) for determining the measurement distance-indicating coordinate of the abnormally asymmetric peak region, the measurement distance-indicating coordinate is located near pixel 516, which is a very large error, and is closer to the peak pixel coordinate of approximately 532, associated with the SRP wavelength peak.

With regard to the embodiment of FIG. 5, in various embodiments, the CRS system 500 may be operated to provide an output spectral profile from a measurement point on a workpiece surface and provide the corresponding output spectral profile data (e.g., the profile data 610). The output spectral profile data may be analyzed to determine a related measurement data reliability category. The analysis of the output spectral profile data may compromise utilizing reliability criteria that define intensity and/or shape-related measurement data reliability category. By analyzing the output spectral profile data with such reliability criteria, a determination can be made as to whether an intensity and/or shape-related measurement data reliability category applies to the measurement data. As a specific example, an analysis of the measurement data of FIG. 6 utilizing reliability criteria for the "abnormally asymmetric peak region" reliability category will be described in more detail below.

It will be appreciated that determining what reliability criteria should be utilized to define a given reliability category may require consideration of a number of factors. For example, with regard to an abnormally asymmetric peak region (e.g., such as that illustrated in FIG. 6), such a peak region may or may not include the particular anomalous effect wherein the secondary reflection peak is larger than the primary reflection peak. Furthermore, the peaks need not be so widely separated as to be separately distinguishable in the output spectral profile (e.g., they may appear to form a single distorted peak). In any case, from the foregoing description it will be understood that when an unexpected secondary reflection contributes significantly to the output spectral profile, it will cause the peak region to become significantly asymmetric. Thus, identifying an abnormally asymmetric peak region is in some implementations considered to be sufficient for identifying a potentially unreliable measurement, at least in cases where special signal processing is not being used to identify expected dual peaks for transparent thin film measurement, or the like. Thus, in various embodiments, it may be considered advantageous for a CRS system (or a host system attached to the CRS system) to be able to analyze peak region data in order to characterize the peak region asymmetry, and thus provide a basis for determining if the measurement data should be associated with an "abnormally asymmetric peak region" reliability category.

With regard to the specific reliability criteria that may be chosen to define the "abnormally asymmetric peak region" reliability category, it will be appreciated that various types of asymmetry characterizations are described herein, and that other methods of characterizing the asymmetry of a peak region will be apparent to one skilled in the art. In one embodiment, the reliability criteria for determining whether measurement data falls within the "abnormally asymmetric peak region" reliability category comprises determining whether the peak region is determined to be abnormally asymmetric by the given method of characterization that is chosen. In some embodiments, the degree of asymmetry that is considered "abnormal" may be determined heuristically, by measuring well behaved, representative "normal" workpieces, and determining an expected normal range of asymmetry (according to a chosen method of characterization). In some embodiments, the degree of asymmetry that is considered "abnormal" may be determined by analysis, for example, by determining an amount of asymmetry (according to a chosen method of characterization) that results in displacement of the centroid by an amount that creates a distance measurement error that exceeds a desired error limit.

In some embodiments, the step of analyzing the output spectral profile data to provide a peak region asymmetry characterization comprises determining the value of a peak region asymmetry metric based on the output spectral profile data. In some embodiments, the reliability criteria for determining whether the output spectral profile data falls within the "abnormally asymmetric peak region" reliability category may comprise comparing the value of the peak region asymmetry metric to an asymmetry metric threshold value (e.g., determined heuristically, or by analysis). In some embodiments, determining the value of a peak region asymmetry metric may comprise determining a peak pixel coordinate (e.g., the peak pixel coordinate, or the peak position index coordinate) based on the output spectral profile data, determining a measurement distance-indicating coordinate based on the output spectral profile data (e.g., a centroid of the peak region), and determining the value of the peak region asymmetry metric based on a difference between the peak pixel coordinate and the measurement distance-indicating coordinate. For example, it will be appreciated that for a perfectly symmetric peak region these coordinates will be nominally the same, and for a significantly asymmetric peak region (such as that shown in FIG. 6), there is a significant difference between the peak pixel coordinate and the measurement distance-indicating coordinate. In some embodiments, the difference between the peak pixel coordinate and the measurement distance-indicating coordinate is a number of pixels and the asymmetry metric threshold value comprises a threshold number of pixels which may be at least 5 pixels in some embodiments. For the example shown in FIG. 6, the difference is approximately 16 pixels. This type of asymmetry characterization has advantages such as fast execution and reuse of data that may already be required for normal measurement operations. However, it is exemplary only, and not limiting. It will be appreciated that in general, various peak region asymmetry metrics may be determined to identify abnormally asymmetric peak regions. For example, in some embodiments, a skewness measure may be applied to determine a peak region asymmetry metric according to methods such as a third standardized moment, a Pearson coefficient, or other known skewness metric. In some embodiments, the threshold number of pixels or skewness may be selected by a user in a user interface connected to the CRS system (e.g., a user interface in the host system 580).

In some embodiments, the corresponding reliability categorization (e.g., the "abnormally asymmetric peak region" reliability categorization, etc.) from the CRS system 500 may be output (e.g., to the host system 580). In some embodiments, the reliability categorization may be output in association with a corresponding measurement distance output by the CRS system (e.g., in a measurement data set that is output by the CRS system each measurement cycle). In certain implementations, the reliability characterization may be included and stored as metadata with the corresponding measurement distance. A specific example of an association of a reliability categorization with a corresponding measurement point is described in more detail below with respect to FIG. 7.

Figure 7:
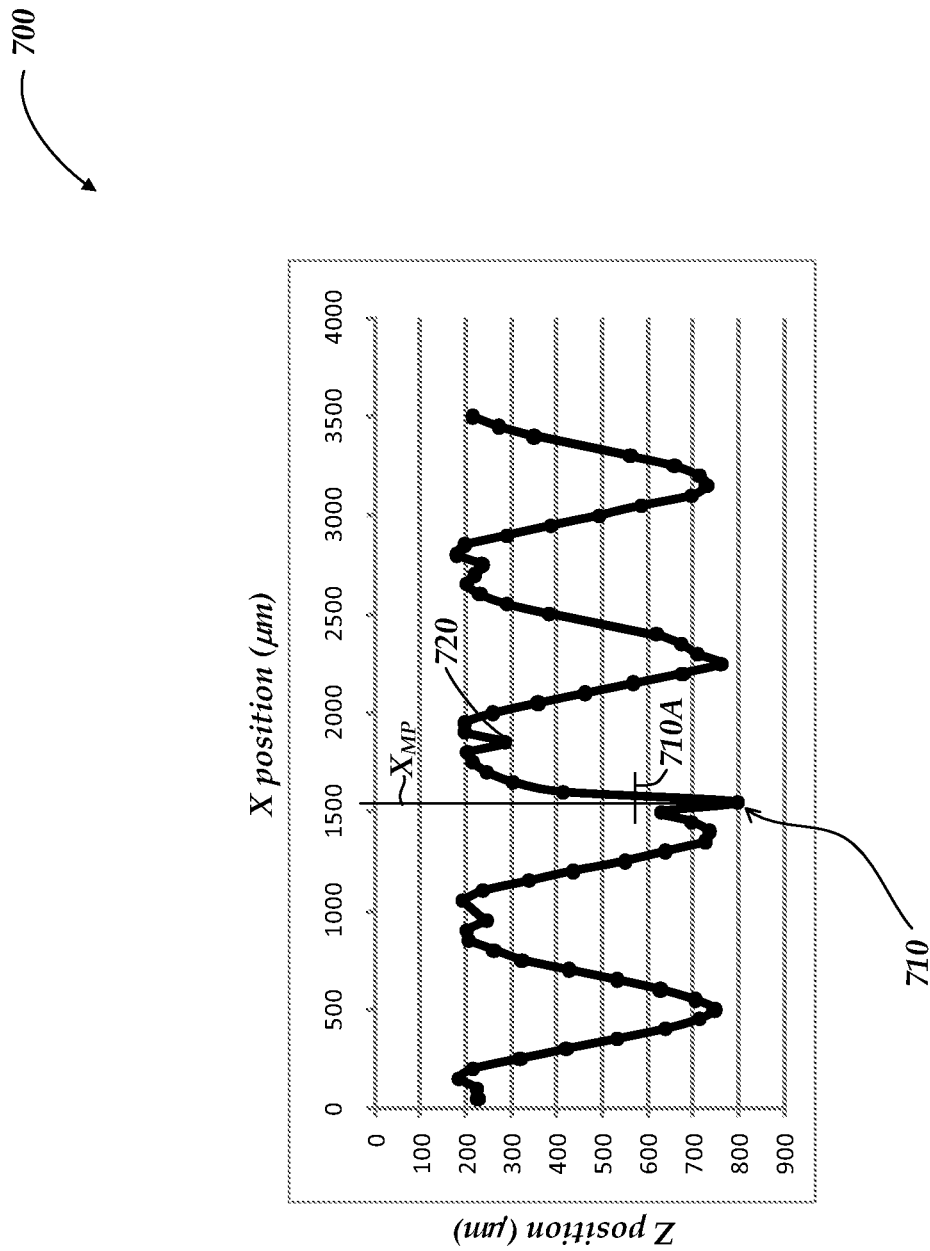
FIG. 7 is a diagram of a surface profile corresponding to a workpiece similar to that shown in FIG. 5 and comprising multiple measurement points.

FIG. 7 is a diagram 700 of a surface profile of some rolled threads (e.g., screw threads), analogous to the schematic surface profile shown in FIG. 5, which comprises multiple measurement points. The surface profile is illustrated as a plot of the Z height versus X position. A measurement point 710 is analogous to the measurement point MP shown in FIG. 5, in that it produces an erroneous measurement value influenced by a secondary reflection, and an associated asymmetric peak region such as that shown in FIG. 6. While previously known methods of analyzing thread profile data based on CRS measurement data might eliminate certain measurement points (e.g., measurement point 710) based on certain factors (e.g., geometric outlier analysis), based on the systems and methods disclosed herein, such points may be eliminated more quickly, robustly, and reliably, based on a measurement data reliability category (e.g., the "abnormally asymmetric peak region" reliability category) provided by the CRS system along with the associated distance measurement value. The value of this approach may be further demonstrated by consideration of other measurement points (e.g., measurement point 720) that may otherwise appear to be in error, and would be eliminated based on prior techniques (e.g., geometric outlier analysis), but which would be robustly and reliably retained based on the absence of a negative reliability category (e.g., the "abnormally asymmetric peak region" reliability category) being provided with the distance measurement value.

As previously outlined, it is not conventional in CRS systems to provide both a measurement (or measurement data) and a reliability category for that measurement (or measurement data) that is based on an analysis of data and/or operations that are ordinarily internal to the CRS system (e.g., in contrast to geometric outlier criteria that are based on post-processing of a number of data points). Such a combination of information may be helpful diagnostic information, for improving automated CRS measurement routines, and understanding problematic measurement locations on workpieces, among other uses. In addition, it should be appreciated that CRS systems are computationally intensive, and a high measurement rate may require a high degree of pipelining of operations and/or synchronous operations that exclude conditional operations. Therefore, it may be useful to process and/or output a measurement at a desired high rate, regardless of its reliability, and then categorize the reliability of that measurement as a separate processing and/or output operation.

As will be described in more detail below with respect to FIGS. 8-10, in addition to abnormally asymmetric peak regions, other circumstances and conditions may also violate the assumptions of the fast processing methods and/or the assumptions used for calibration. In various embodiments, an indication that a related measurement result may be unreliable may be provided in the form of a measurement data reliability category that is provided with the measurement result.

As described above, a measurement data reliability category directed to an abnormally asymmetric peak region may indicate measurement data such as that illustrated in FIG. 6, while other measurement data reliability categories may be utilized to indicate other circumstances and conditions that may affect the reliability of the measurement data. More specifically, other circumstances and conditions that may affect the reliability of the measurement data may also be indicated by other reliability categories (e.g., a saturated spectral peak, a duty cycle having been adjusted during measurement, a distance-indicating coordinate (e.g., a signal centroid) of a spectral peak being out of an acceptable measurement range, a peak intensity of a spectral peak being below a threshold, an accumulator of the control system having overflowed, etc.). It will be appreciated that some of these reliability problems and/or categories may be related to the internal operations of the CRS system during a CRS measurement cycle, instead of (or in addition to) problematic workpiece surface locations that produce unwanted secondary reflections. Measurement reliability problems during a CRS measurement cycle may often be associated with abrupt changes in the height or slope of a workpiece profile, and particularly when traversing along such a profile at a motion rate that is high relative to the measurement cycle rate of a CRS system, such that measurement conditions are changing (or simply inappropriate) during a CRS measurement cycle.

In some embodiments, it may be desirable to provide such features related to measurement data reliability categories automatically for every measurement cycle of the CRS. In some embodiments, it may be desirable to provide these features according to a user selection of a related operating mode or parameter, such that the user may invoke such features for measuring workpieces or measurement points that are likely to produce unreliable measurement data, and may suppress such features when measuring workpieces or measurement points that are more likely to produce reliable measurement data.

FIG. 8 is a diagram of a table 800 illustrating one embodiment of example measurement data reliability categories and corresponding CRS measurement data reliability criteria. As shown in FIG. 8, the table 800 includes a reliability category column 820, a type column 830 and a category criteria description column 840. The entries in the reliability category column 820 indicate the names of the measurement data reliability categories. The entries in the type column 830 indicate whether the specified measurement data reliability categories are associated with an error or a warning, in this particular embodiment. The entries in the criteria description column 840 provide at least a partial description of some of the criteria that may be utilized for determining when a set of measurement data is to be associated with a specified measurement data reliability category.

With regard to the type column 830, in one specific example embodiment, the measurement data reliability categories are generally classified as being either of a warning type or of an error type. Warnings generally indicate that a problem or potential risk of error was detected with the measurement data, however the system was still operated to determine a position measurement. Errors generally indicate that there was a more severe problem with the measurement data, and a position value may not be determined with a reasonable degree of certainty. For errors, in one specific example embodiment, a position or measurement output value may be set to not-a-number (NaN), which is a standard floating point definition (i.e., see IEEE 754).

It will be appreciated that during operation, when operations of the CRS system (or a host system, in some embodiments) determine that a reliability category criteria is met for a measurement cycle or measurement, that in one embodiment a corresponding code associated by the CRS with a particular reliability category may be output by the CRS system (or a host system, in some embodiments), and/or in some embodiments may be stored as reliability category metadata with workpiece height measurements. The code is one indicator of the corresponding determined measurement data reliability category, and may be output and/or read and/or displayed in association with the corresponding measurement cycle and/or warning or error indication and/or measurement.

It will be appreciated that classifying certain measurement data reliability categories as corresponding to errors or warnings may provide certain advantages. For example, with respect to the row 850H, when an "abnormally asymmetric peak region" reliability category is indicated (e.g., as previously described with respect to FIGS. 5-7), the "warning" classification may be desirable. This is because, for such indications, a user may have additional relevant information (e.g., if the thickness of a transparent thin film is what is being measured, then abnormally asymmetric peak regions may be expected for the measurements, etc.). By providing these types of "warnings" along with the workpiece height measurements (as opposed to "errors" where no workpiece height measurement is provided), a user is able to make informed decisions regarding what is to be done regarding the associated measurement data (e.g., using the data or not, adjusting the system to improve the measurements, etc.).

In certain implementations, the warnings and/or errors may be organized according to a ranking system, and only the most severe warning or error that has most recently occurred may be provided with a given measurement. Such a ranking system may be advantageous in certain implementations (e.g., where the measurement points are provided on a surface profile in the form of reliability category indicators, as will be described in more detail below with respect to FIG. 9). In other words, in certain implementations, only one reliability category indicator may be provided with each measurement point, and the reliability category indicator corresponding to the most severe warning or error may be the most relevant to provide. As a specific example, if a given set of measurement data is determined to have both a saturated signal (i.e., a warning as indicated in row 850E) and be out of range (i.e., an error as indicated in row 850C), the out of range error may be considered to be the more relevant to report, since once that error occurs, which may prevent a position value from being determined, the indication that the signal was also saturated may be less critical).

As specific examples of the measurement data reliability categories, each of the rows 850A-850J of the table 850 indicates a specific reliability category and corresponding CRS measurement data reliability criteria. For example, the row 850A indicates a "Normal" reliability category, for which the criteria description is "no category criteria violations." In other words, the "Normal" reliability category may be associated with measurement data that does not violate a normal measurement criteria, that is, none of the criteria associated with reliability categories indicated in rows 850B-850J are met, such that a warning or error indication need be provided, as will be described in more detail below.

The row 850B indicates an "Invalid Position Table" reliability category, for which the criteria description is "The current position table does not match the system hardware." This criteria may be evaluated in one embodiment by a sub-routine of the CRS electronics that compares a store identifier or value associated with position table data to a stored identifier or value associated with the CRS system hardware. The row 850C indicates an "Out of Range" reliability category, for which the criteria description is "The distance-indicating coordinate determined for the profile is outside of the valid range of the position lookup table." This criteria may be evaluated in one embodiment by a sub-routine of the CRS electronics that compares the value of the distance-indicating coordinate to maximum and minimum limits of the distance-indicating coordinate range of the position lookup table. The row 850D indicates a "Not Enough Signal" reliability category, for which the criteria description is "The peak intensity of the profile is below a predetermined threshold, indicating an unacceptable S/N ratio." This criteria may be evaluated in one embodiment by a sub-routine of the CRS electronics that compares the value of the peak intensity to a predetermined threshold. In one embodiment, the predetermined threshold may be a stored intensity value. In another embodiment, the predetermined threshold may be a dynamic threshold that is a predetermined value times an average background level intensity of the profile data of a current measurement cycle (e.g., an average intensity outside the peak region). The row 850E indicates a "Saturated Signal" reliability category, for which the criteria description is "The profile includes a number of saturated pixels that exceeds a predetermined limit, indicating improper measurement conditions. It is noted that while the "saturated signal" category of row 850E may be classified as being an error, in certain implementations the CRS system may alternatively classify a "saturated signal" reliability category as a warning. In some embodiments, a user may elect to have this criteria treated as an error or a warning, by sending a command to the CRS electronics. This criteria may be evaluated in one embodiment by a sub-routine of the CRS electronics that counts the number of detector pixels that produce saturated output values in the profiles, and compares that number of pixels to a predetermined limit (e.g., 1, 2, or 5 pixels, or more). The row 850F indicates an "Algorithm Overflow" reliability category, for which the criteria description is "A DSP accumulator overflowed, indicating improper signals processing conditions." This criteria may be evaluated in one embodiment by a sub-routine of the CRS electronics that responds to an accumulator overflow indication by providing an appropriate error flag, or stored value, or the like.

The row 850G indicates an "Adjusting Duty Cycle" reliability category, for which the criteria description is "An intensity adjustment (e.g., lighting or detector gain) was not stabilized prior to profile acquisition, indicating potentially improper measurement conditions." This criteria may be evaluated in one embodiment by a sub-routine of the CRS electronics that is initiated when an adjustment command begins intensity adjustment operations in the CRS electronics, and provides an appropriate error flag, or stored value, or the like, corresponding to each measurement cycle or measurement that occurs before the adjustment is completed. In one embodiment, the CRS system may monitor an actual intensity output (e.g., as provided by an optical sensor) or control signal (e.g., a digital duty cycle signal) for stability. In another embodiment, a predetermined stabilization period, or predetermined number of measurement cycles corresponding to a known stabilization period, may be stored in the CRS electronics, and the start of an adjustment triggers the CRS electronics to automatically provides an appropriate error flag, or stored value, or the like corresponding to each measurement cycle within that period. The row 850H indicates an "Abnormally Asymmetric Peak Region" reliability category, for which the criteria description is "A peak region asymmetry characterization (e.g., a peak pixel vs. distance-indicating coordinate comparison) is indicative of an abnormal or unexpected profile (e.g., the characterization exceeds a predetermined threshold), indicating potentially improper measurement conditions." This criteria may be evaluated in one embodiment by a sub-routine of the CRS electronics that performs an analysis of profile data as previously described with respect to FIGS. 5-7. The row 850I indicates an "Errors During Averaging" reliability category which results in a warning, for which the criteria description is "When operating in averaging mode, a number of 'error' and/or 'warning' type measurement points in a sample was below a predetermined %, so they were ignored, and the measurement average was based on remaining points." The row 850I indicates an "Errors During Averaging" reliability category which results in an error, for which the criteria description is "When operating in averaging mode, the number of 'error' and/or 'warning' type measurement points in the sample exceeded a predetermined %, indicating unacceptable measurement conditions." This criteria may be evaluated in one embodiment by a sub-routine of the CRS electronics that performs the implied data analysis when the averaging mode operations are performed.

It will be appreciated that the categories and operations described in relation to the table 800 are exemplary only, and not limiting. Other categories and/or criteria may be used and implemented in various ways by one skilled in the art based on the principles disclosed herein.

Figure 9:
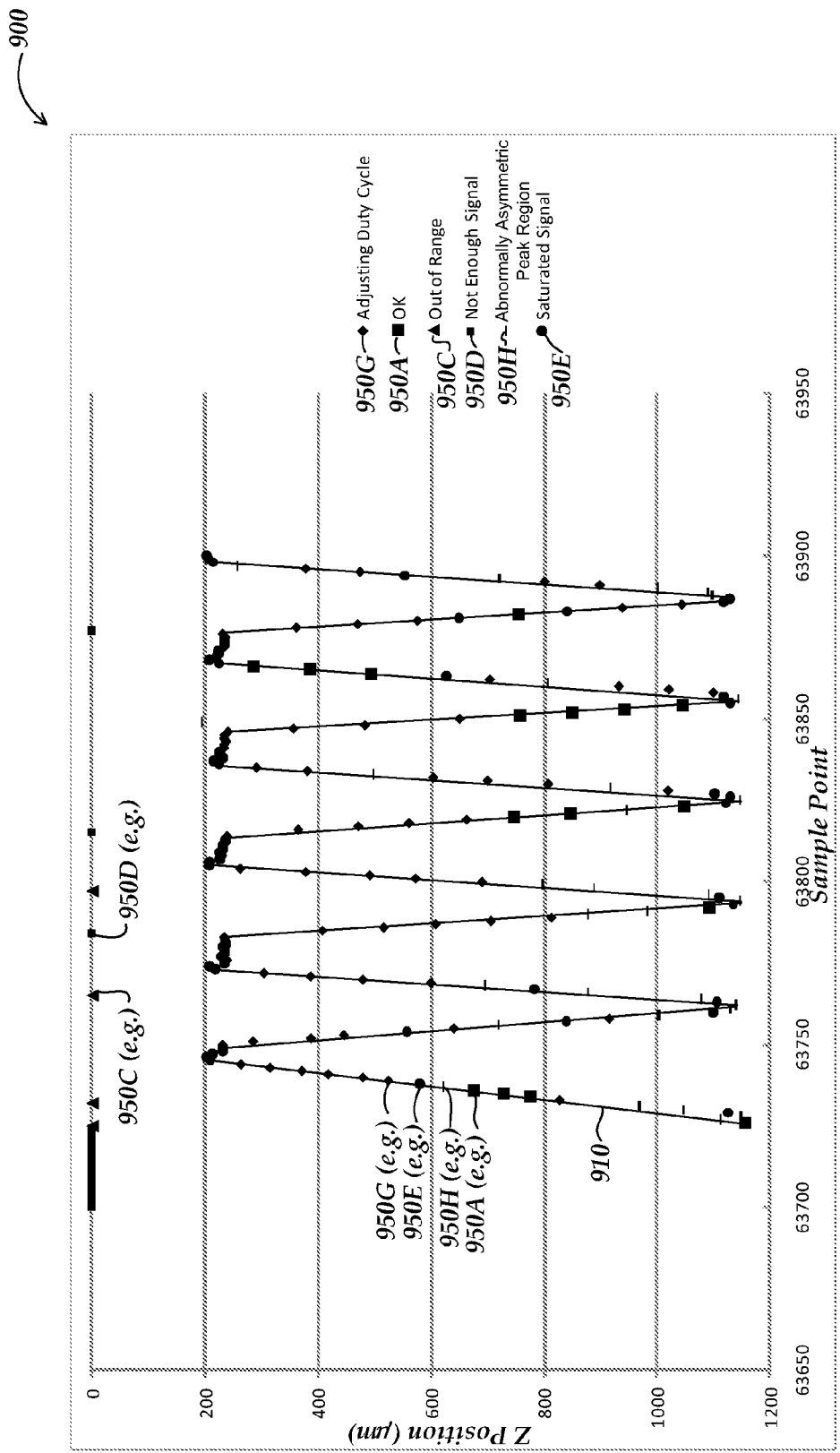
FIG. 9 is a diagram of a surface profile corresponding to a workpiece similar to that shown in FIG. 5 and comprising multiple measurement points and associated reliability category indicators.

FIG. 9 is a diagram 900 of a surface profile 910 corresponding to a workpiece similar to that shown in FIG. 5 and comprising multiple measurement points and associated reliability category indicators. As shown in FIG. 9, the displayed reliability category indicators include indicators 950A, 950C, 950D, 950G, 950E, and 950H. Examples of each of the indicators are shown on the surface profile 910. It will be appreciated that while each of the indicators 950A, 950C, 950D, 950G, 950E, and 950H are illustrated as comprising a unique shape and/or size, in alternative embodiments other distinguishing characteristics may also or alternatively be utilized (e.g., unique codes, colors, etc.).

As shown in FIG. 9, the indicator 950A (i.e., represented as a medium sized block) corresponds to an "OK" reliability category (e.g., in one embodiment corresponding to the "Normal" category in row 850A of FIG. 8). The indicator 950C (i.e., represented as a triangle) corresponds to an "Out of Range" reliability category (e.g., in one embodiment corresponding to the "Out of Range" category in row 850C of FIG. 8). The indicator 950D (i.e., represented as a small block) corresponds to a "Not Enough Signal" reliability category (e.g., in one embodiment corresponding to the "Not Enough Signal" category in row 850D of FIG. 8). As illustrated in FIG. 9, the indicators 950C and 950D correspond to "errors," wherein a measurement can not be determined, and thus when they occur the related symbols are located at the top of the diagram 900 with a position value of "0" for display purposes, although it should be appreciated that the measurements may be processed as a "null" value. In contrast, as will be described in more detail below, the indicators 950G, 950E and 950H correspond to "warnings," wherein a measurement is still being determined, and so are displayed at the corresponding measurement locations on the surface profile 910.

As shown in FIG. 9, the indicator 950G (i.e., represented as a diamond) corresponds to an "Adjusting Duty Cycle" reliability category (e.g., in one embodiment corresponding to the "Adjusting Duty Cycle" category in row 850G of FIG. 8). The indicator 950E (i.e., represented as a circle) corresponds to a "Saturated Signal" reliability category (e.g., in one embodiment corresponding to the "Saturated Signal" category in row 850E of FIG. 8). The indicator 950H (i.e., represented as a dash) corresponds to an "Abnormally Asymmetric Peak Region" reliability category (e.g., in one embodiment corresponding to the "Abnormally Asymmetric Peak Region" category in row 850H of FIG. 8). It will be appreciated that the reliability category indicators 950A, 950C, 950D, 950G, 950E, and 950H advantageously provide a user with reliability information for making informed decisions regarding the associated measurement points (e.g., deciding to eliminate or ignore data that is associated with certain reliability category indicators, or making adjustments to the CRS set up or an associated automated measurement routine to achieve improved measurements, etc.).

Figure 10:
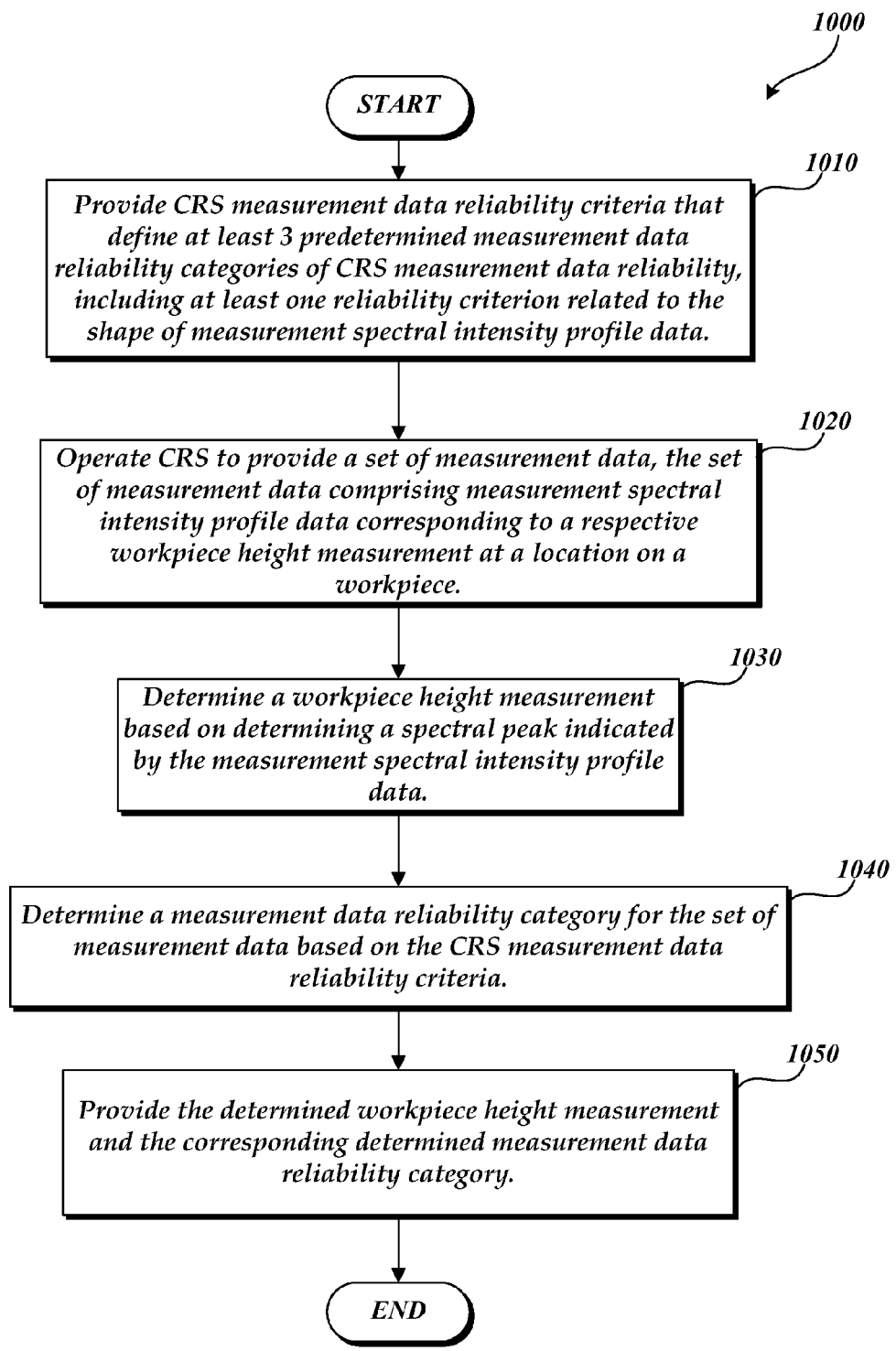
FIG. 10 is a flow diagram illustrating a routine for operating a CRS system to provide determined measurement data reliability categories with workpiece height measurements.

FIG. 10 is a flow diagram illustrating a routine 1000 for operating a chromatic range sensor (CRS) system to provide determined measurement data reliability categories along with workpiece height measurements. As shown in FIG. 10, at a block 1010, CRS measurement data reliability criteria are provided that define at least three predetermined measurement data reliability categories of CRS measurement data reliability, including at least one reliability criterion related to the shape of measurement spectral intensity profile data. As previously described with respect to FIGS. 5-7, one specific example of a reliability criterion related to the shape of measurement spectral intensity profile data is a reliability criterion associated with the "abnormally asymmetric peak region" reliability category. At a block 1020, the CRS is operated to provide a set of measurement data, wherein the set of measurement data comprises measurement spectral intensity profile data corresponding to a respective workpiece height measurement at a location on a workpiece.

At a block 1030, a workpiece height measurement is determined based on determining a spectral peak indicated by the measurement spectral intensity profile data. At a block 1040, a measurement data reliability category is determined for the set of measurement data based on the CRS measurement data reliability criteria. At a block 1050, the system provides the determined workpiece height measurement and the corresponding determined measurement data reliability category.

In various embodiments, performing the foregoing operations may comprise providing a CRS system comprising: an optical element configured to focus different wavelengths at different distances proximate to a workpiece surface to be measured, a light source connected to provide an input spectral profile of wavelengths to the optical element; and a CRS electronics comprising a CRS wavelength detector comprising a plurality of pixels distributed along a measurement axis of the CRS wavelength detector, the plurality of pixels receiving respective wavelengths and providing output spectral profile data, wherein the CRS is configured such that when the optical element is connected to the CRS electronics and operably positioned relative to the workpiece surface to perform measurement operations the optical element inputs the input spectral profile and outputs corresponding radiation to the workpiece surface and receives reflected radiation from the workpiece surface and outputs reflected radiation to provide an output spectral profile to the CRS wavelength detector, the output spectral profile including a peak region having a wavelength peak that indicates a measurement distance from the optical element to the workpiece surface, and the CRS electronics provides corresponding output spectral profile data. The CRS system is then operated to provide an output spectral profile from a measurement point on a workpiece surface and provide the corresponding output spectral profile data. The foregoing operations may be performed under the control of the CRS electronics in some embodiments, or a host system in other embodiments. Similarly, the CRS measurement data reliability criteria may be provided by the CRS electronics in some embodiments, or a host system in other embodiments (e.g., as embodied in a corresponding criteria evaluation routine, or the like. In one embodiment, a signal processing system may analyze output spectral profile data by executing a desired analysis routine stored in memory, in order to determine an appropriate reliability category. For certain reliability categories (e.g., for an "abnormally asymmetric peak region" reliability category), the analysis routine may determine a characterization for the output spectral profile data, and the result in some instances may be compared to a normally expected result or results stored in memory. In certain embodiments, the determined reliability category may be stored as metadata with the associated workpiece height measurement.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for enhancing the utility of workpiece height measurements determined by a chromatic range sensor (CRS) system, the method comprising:

providing CRS measurement data reliability criteria that define at least three predetermined measurement data reliability categories of CRS measurement data reliability, including at least one reliability criterion related to the shape of measurement spectral intensity profile data, wherein at least one of the three predetermined measurement data reliability categories is classified as being a type of warning wherein a workpiece height measurement can still be determined, and at least one of the three predetermined measurement data reliability categories is classified as being a type of error wherein a workpiece height measurement is not determined;

operating the CRS system to provide a set of measurement data, the set of measurement data comprising measurement spectral intensity profile data corresponding to a respective workpiece height measurement at a location on a workpiece;

determining a workpiece height measurement based on determining a spectral peak indicated by the measurement spectral intensity profile data;

determining a measurement data reliability category for the set of measurement data based on the CRS measurement data reliability criteria; and providing the determined workpiece height measurement and the corresponding determined measurement data reliability category.

2. The method of claim 1, wherein the step of determining the measurement data reliability category for the set of measurement data based on the CRS measurement data reliability criteria is performed by the CRS system.

3. The method of claim 2, wherein the step of determining the measurement data reliability category for the set of measurement data based on the CRS measurement data reliability criteria is performed automatically by the CRS system.

4. The method of claim 3, wherein the steps of operating the CRS system to provide a set of measurement data, determining a workpiece height measurement, determining a measurement data reliability category, and providing the determined workpiece height measurement and the corresponding determined measurement data reliability category, are performed repeatedly.

5. The method of claim 4, wherein the repeated performance of the steps is done at a measurement rate of the CRS system.

6. The method of claim 1, wherein the respective reliability categories correspond to a state including one of:
an abnormally asymmetric peak region of spectral intensity profile data;
a saturated spectral peak;
an intensity adjustment was not stabilized prior to acquisition of the measurement spectral intensity profile data;
a distance-indicating coordinate of a spectral peak being out of an acceptable measurement range;
a peak intensity of a spectral peak being below a threshold; and
an accumulator of the control system having overflowed.

7. The method of claim 1, wherein the at least one reliability criterion related to the shape of measurement spectral intensity profile data is configured to identify abnormal asymmetry of the peak region of the measurement spectral intensity profile data.

8. The method of claim 7, wherein the identification of the abnormal asymmetry includes identifying abnormal asymmetry due to spurious measurement light reflection from a second location on the workpiece.

9. The method of claim 1, wherein the CRS system is further operated to provide a plurality of sets of measurement data and the shape criterion is evaluated for each set of measurement data.

10. The method of claim 1, wherein the shape criterion is evaluated in real time during a single measurement cycle that comprises the operation of the CRS system to provide the corresponding set of measurement data.

11. The method of claim 1, wherein the shape criterion comprises determining a difference between a peak pixel and a distance-indicating coordinate of the peak region.

12. The method of claim 1, wherein the measurement data reliability category is provided internally to the CRS system each cycle.

13. The method of claim 1, wherein the measurement data reliability category is output based on an output data selection determined by a user.

14. The method of claim 1, wherein the CRS system comprises a chromatic point sensor system and the optical element comprises an optical pen.

15. The method of claim 1, wherein metadata regarding the corresponding determined measurement data reliability category is stored with the corresponding determined workpiece height measurement.

16. The method of claim 1, wherein the measurement data reliability category that is defined by the reliability criterion related to the shape of the measurement spectral intensity profile is classified as being a type of warning.

17. The method of claim 1, wherein the at least one reliability criterion related to the shape of measurement spectral intensity profile data is related to the shape of a peak region of the measurement spectral intensity profile data configured to identify when the shape of the peak region is associated with reflections from two or more portions of the workpiece.

18. The method of claim 17, wherein the at least one reliability criterion related to the shape of the peak region of the measurement spectral intensity profile data is configured to identify abnormal asymmetry of the peak region of the measurement spectral intensity profile data.

19. A method for enhancing the utility of workpiece height measurements determined by a chromatic range sensor (CRS) system, the method comprising:
providing CRS measurement data reliability criteria that define at least three predetermined measurement data reliability categories of CRS measurement data reliability, including at least one reliability criterion related to the shape of measurement spectral intensity profile data;
operating the CRS system to provide a set of measurement data, the set of measurement data comprising measurement spectral intensity profile data corresponding to a respective workpiece height measurement at a location on a workpiece;
determining a workpiece height measurement based on determining a spectral peak indicated by the measurement spectral intensity profile data;
determining a measurement data reliability category for the set of measurement data based on the CRS measurement data reliability criteria;
providing the determined workpiece height measurement and the corresponding determined measurement data reliability category; and
displaying in a user interface the workpiece height measurement with an indicator of the corresponding determined measurement data reliability category, wherein the user interface includes a graphical display of a plurality of workpiece height measurements with graphical indicators of the corresponding determined measurement data reliability categories, wherein the graphical indicators comprise at least one of a unique shape or color.

* * * * *